United States Patent [19]
Rey et al.

[11] Patent Number: 6,110,535
[45] Date of Patent: Aug. 29, 2000

[54] METHOD FOR DELIVERING A MOLTEN SILICON COMPOSITION INTO POROUS SUBSTRATES

[75] Inventors: Jacques Rey, Merignac; Michel Laxague, Bordeaux Cauderan; Bruno Bernard, Pessac, all of France

[73] Assignee: Societe Nationale d'Etude et Construction de Moteurs D'Aviation, Paris, France

[21] Appl. No.: 09/068,700

[22] PCT Filed: Oct. 14, 1996

[86] PCT No.: PCT/FR96/01598

§ 371 Date: May 13, 1998

§ 102(e) Date: May 13, 1998

[87] PCT Pub. No.: WO97/18176

PCT Pub. Date: May 22, 1997

[30] Foreign Application Priority Data

Nov. 14, 1995 [FR] France ................................ 95 13458

[51] Int. Cl.[7] ................................. B05D 1/18; B05D 3/02
[52] U.S. Cl. ................................. 427/383.3; 427/376.2; 427/376.3; 427/379.7; 427/430.1; 427/431
[58] Field of Search ................................. 427/204, 205, 427/229, 376.2, 376.3, 397.7, 431, 430.1, 383.3

[56] References Cited

U.S. PATENT DOCUMENTS

| | | |
|---|---|---|
| 4,572,848 | 2/1986 | Pollak et al. . |
| 4,626,516 | 12/1986 | Morelock ................................. 501/92 |
| 5,019,430 | 5/1991 | Higgins et al. ....................... 427/430.1 |
| 5,205,970 | 4/1993 | Brun et al. ................................. 264/60 |
| 5,324,692 | 6/1994 | Benker et al. . |
| 5,338,576 | 8/1994 | Hanzawa et al. ..................... 427/430.1 |
| 5,505,805 | 4/1996 | Papenburg et al. ..................... 156/155 |

FOREIGN PATENT DOCUMENTS

| | | |
|---|---|---|
| 0 093 532 | 11/1983 | European Pat. Off. . |
| 0 636 700 | 2/1995 | European Pat. Off. . |
| 2 137 974A | 10/1984 | United Kingdom . |
| 2137974 | 10/1984 | United Kingdom . |

*Primary Examiner*—Timothy Meeks
*Assistant Examiner*—Michael Barr
*Attorney, Agent, or Firm*—Weingarten, Schurgin, Gagnebin & Hayes LLP

[57] ABSTRACT

A plurality of substrates (10) are disposed in alternation and in contact with layers (12) which constitute sources of metal-based composition, each layer comprising a majority phase formed by the metal-based composition and a minority phase suitable for forming a structure for retaining and draining the metal-based composition when it is in the molten state. The batch is heated to a temperature greater than the melting temperature of the metal-based composition such that the metal-based composition in the molten state can migrate from each source through the adjacent surface of the, or each, substrate adjacent to the source towards the inside of the substrate. The invention seeks in particular to incorporate a silicon-based composition in a thermostructural composite material, in particular a carbon-carbon composite material for siliciding purposes.

24 Claims, 3 Drawing Sheets

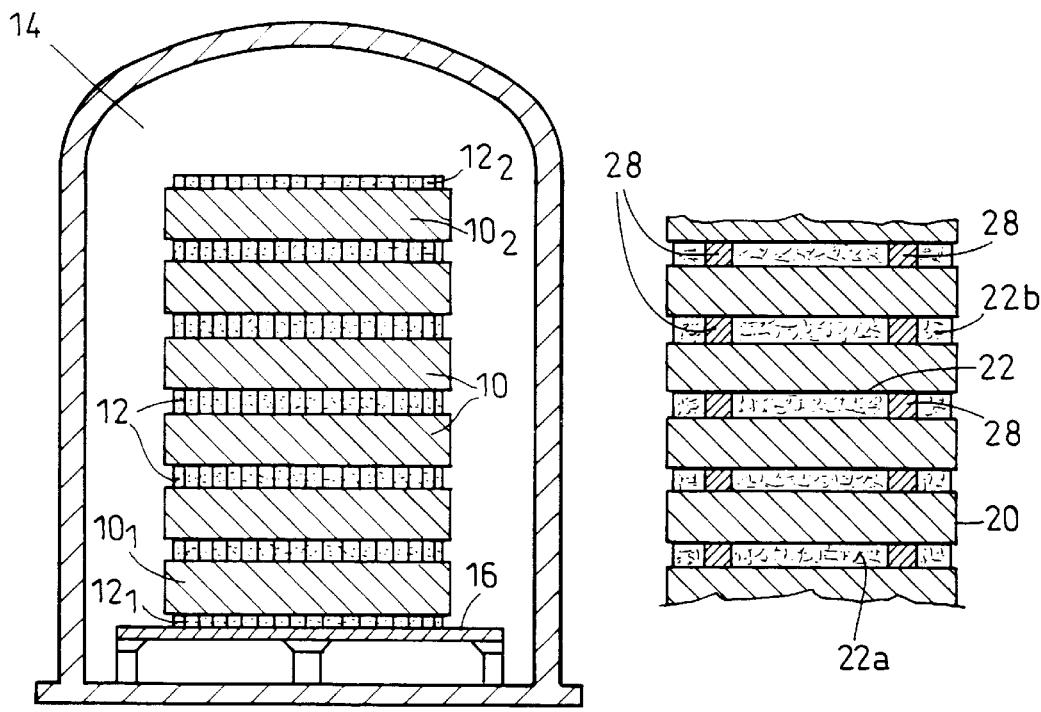
FIG_1
FIG_3A
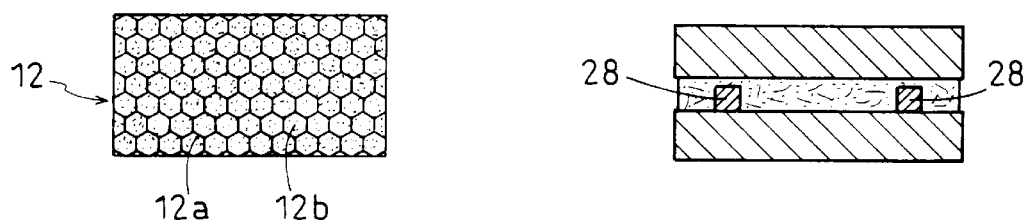
FIG_2
FIG_3B

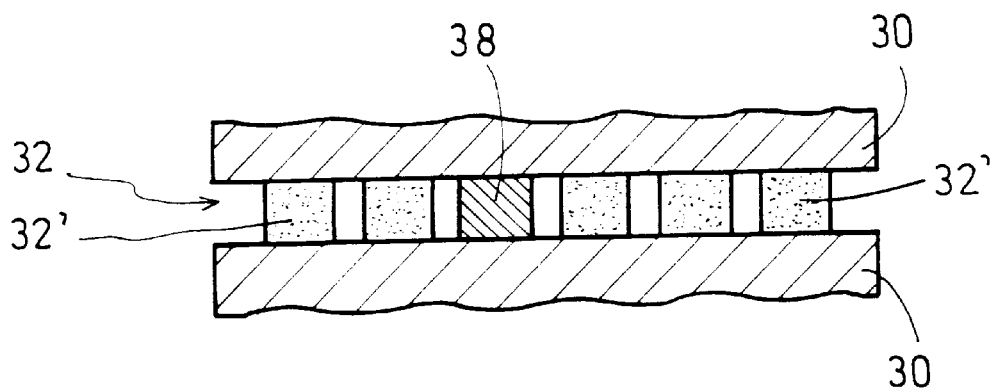
FIG_4
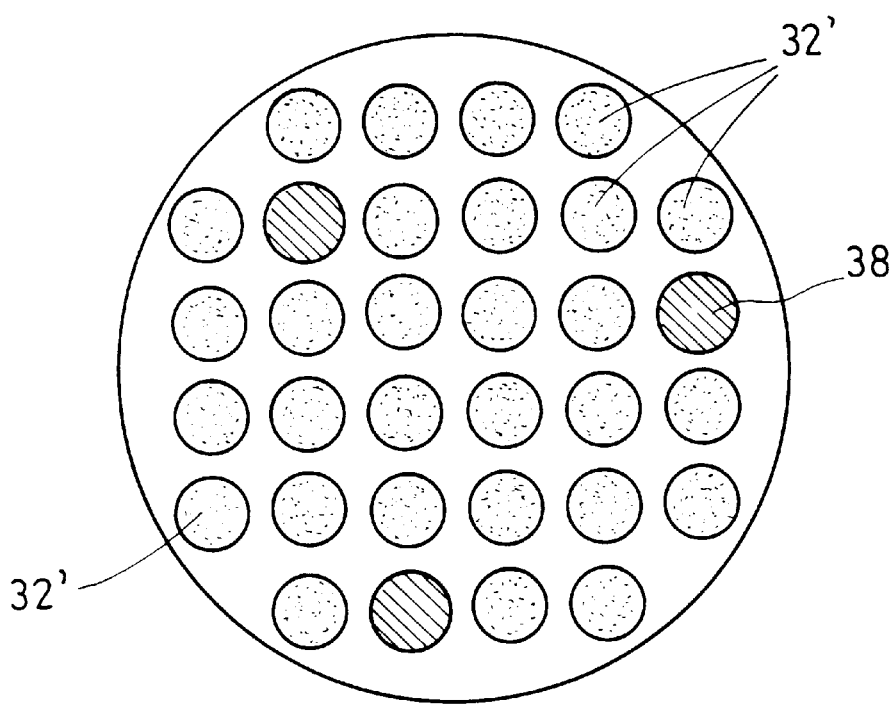
FIG_5

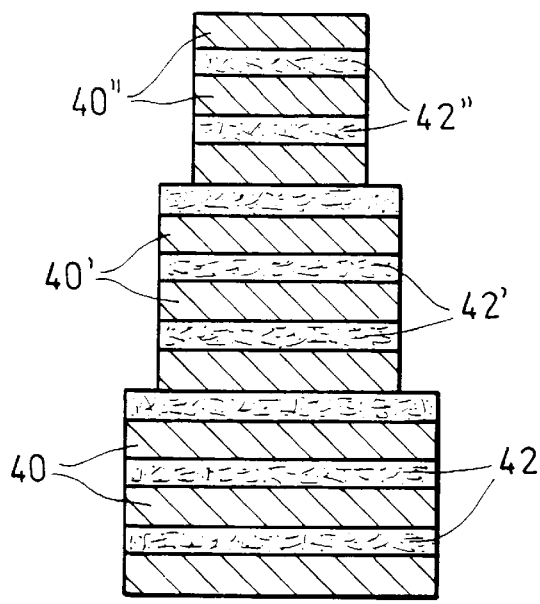
FIG_6
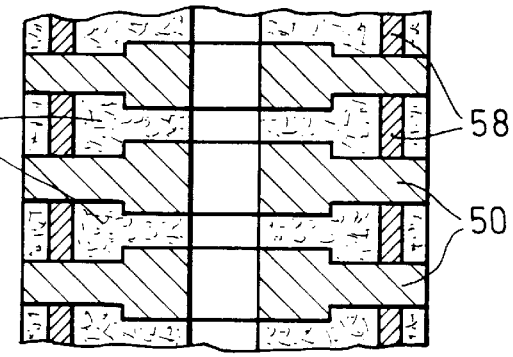
FIG_7
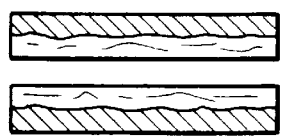
FIG_8

METHOD FOR DELIVERING A MOLTEN SILICON COMPOSITION INTO POROUS SUBSTRATES

The present invention relates to a method of incorporating a molten metal-based composition in porous substrates.

In the present case, the term "metal-based" is used to mean more particularly a composition comprising one or more metals, preferably having a melting temperature that is lower than 2000° C., and capable of forming refractory carbides having a melting temperature greater than 2200° C. Such metals are, in particular, silicon, titanium, zirconium, hafnium, and vanadium.

APPLICATION OF THE INVENTION

A particular field of application is incorporating a metal-based composition, and in particular a composition based on metallic elemental silicon (hereinafter an "Si-based" composition) in substrates of composite material, in particular of thermostructural composite material.

Thermostructural composite materials are characterized by mechanical properties which make them suitable for constituting structural parts, and by their ability to retain these properties at high temperatures. They are constituted by a fibrous reinforcing fabric made of refractory fibers and densified by a refractory matrix. Well known thermostructural composite materials are carbon-carbon (C—C) composites in which the reinforcing fabric is made of carbon fibers and the matrix is made of carbon, and ceramic matrix composites (CMCs) in which the reinforcing fabric is made of carbon fibers or of ceramic fibers and the matrix is made of ceramic, with the ceramic material constituting the fibers and/or the matrix frequently being silicon carbide, SiC.

Parts made of thermostructural composite material are generally fabricated by making a fiber preform and densifying it with the matrix. Well known densification methods include liquid densification which consists in impregnating the preform with a matrix precursor in the liquid state and then transforming the precursor by heat treatment, and densification by chemical vapor infiltration, or a combination of both methods. In which case, densification is performed initially using a liquid and subsequently by chemical vapor infiltration, or vice versa, or indeed by alternating a plurality of times between the two methods.

Whatever the densification method used, parts made of thermostructural composite material inevitably present residual internal pore space that is open, i.e. in communication with the outside of the part.

Thermostructural composite materials are used in a variety of fields where use is made of their ability to retain very good mechanical strength at high temperatures, in particular in the aviation, space, friction, and nuclear fields.

In aviation and in space, these materials are used in particular for jet engine flaps, nozzles, and coatings for protecting spacecraft against heating in the dense layers of the atmosphere. In the friction field, C—C composites are commonly used at present for aircraft brake disks, and their use for land vehicles which is presently restricted to F1 racing cars, will develop. In the nuclear field, C—C composite bricks have been developed in particular to form protective coatings for the walls of plasma confinement chambers in nuclear fusion reactors.

In those various applications, the properties of parts made of thermostructural composite materials can be improved by incorporating a metallic composition, and in particular an Si-based composition, in the residual internal pore space of the parts.

Thus, for parts made of composite material containing carbon, siliciding by incorporating a molten Si-based composition leads to internal silicon carbide protection against oxidation being formed by reaction between the carbon of the composite material and the molten silicon. The improvement in resistance to oxidation of composites containing carbon is particularly important in the aviation and space fields and in the friction field. In addition, for brake disks, siliciding provides particular friction behavior.

In the nuclear field, siliciding bricks for lining plasma confinement chambers significantly improves the ability of the C—C composite to withstand being eroded by the plasma. In addition, the reduction in pore space that results from siliciding limits the amount of radioactive tritium that can be retained in the material. The presence of SiC also makes it possible to limit neutron activation.

In addition, whatever the application, by reducing pore space incorporating an Si-based composition also limits permeability to liquids and to gases, regardless of whether siliciding takes place or not, i.e. whether or not there is any reaction with the carbon that may possibly be contained in the composite material.

The invention thus seeks to provide a method enabling a molten metal-based composition to be incorporated in a part made of thermostructural composite material, or more generally in a porous part or substrate.

STATE OF THE ART

Several methods seeking to incorporate a molten metal composition, and in particular an Si-based composition, in porous parts are described in the prior art.

A first technique consists in immersing the part in the molten metallic composition, either by inserting the part in a bath of metallic composition in the molten state, or by inserting the part into the metallic composition in the powder state and then raising both the part and the composition to above the melting temperature of the metallic composition. One such method is mentioned, in particular in document GB-A-1 457 757. It suffers from several drawbacks. Thus, it is necessary to have a bath-retaining crucible capable of withstanding the temperature and that does not react with the bath. In addition, certain parts, in particular C—C composite parts, run the risk of floating on the surface of the bath because of their density being different from that of the bath. In addition, in order to avoid all of the parts setting together on cooling, it is necessary to extract them while hot, and consequently to have equipment suitable for that purpose.

A second technique consists in immersing the part partially into a bath of molten metallic composition, as mentioned in document U.S. Pat. No. 3,495,939. The liquid composition then penetrates into all of the accessible internal volume of the part by capillarity. It is still necessary to have a crucible for the bath and to extract the part from the bath while hot.

In order to avoid immersion in a bath, even partial immersion, it has been proposed that the capillarity effect can be used by means of a drain connecting a porous substrate to a source of molten metallic composition. The drain may be formed, in particular, by cloth or by a wick having long fibers connecting the substrate, which is possibly placed in a mold, to a source of molten metallic composition outside the substrate. The same drain can be used for a plurality of substrates placed in a stack. Reference can be made, for example, to the following documents: U.S. Pat. No. 4,626,516, EP-A-0 636 700, and EP-A-0 519 643.

The use of that technique raises difficulties associated with the complexity of assembly and with bulk, and also with removing the drain, since after cooling it remains welded to the resulting part.

Another technique consists in bringing the metallic composition to the surface of the part to be treated by means of a suspension which is then dried, or by chemical vapor infiltration or deposition, with subsequent heating above the melting temperature of the metallic composition, as described in document U.S. Pat. No. 4,275,095. The drawbacks that result from using that technique are significant loss of metal by runoff at the time of melting, the major risk of the part sticking to its support, and the need for subsequent machining of the outside of the part. In addition, with parts of relatively large dimensions, processing them throughout their entire volume can require several successive operations. When providing the metallic composition by the chemical vapor infiltration or deposition method, in particular by chemical vapor deposition of silicon at a temperature higher than the melting point of silicon, the long duration and the cost of such processes constitute drawbacks in addition to those mentioned above.

Proposals have also been made in document U.S. Pat. No. 4,019,913 to cause the material of the part to be treated to react with a metal vapor. For silicon, it is necessary to exceed 2000° C. That technique raises the problem of working at very high temperature, and the difficulty of obtaining uniform treatment. In addition, it is necessary to have a crucible capable of containing silicon at that temperature.

Document EP-A-0 093 532 teaches covering the surface of the part to be treated in a layer of a paste formed of silicon powder in suspension in a solution of an organic binder with carbon or graphite powder included therein. By pyrolyzing the binder, heat treatment transforms said layer into an open cellular structure of carbon containing the silicon. By siliciding using molten silicon, the cellular structure is transformed into a silicon carbide skeleton having open pores through which the molten silicon migrates by capillarity towards the part to be treated. That solution presents the advantage of leaving only a friable structure of silicon carbide on the surface of the part, which structure can easily be removed by brushing. Nevertheless, the parts to be treated must be individually covered in the paste, e.g. by means of a spatula, thus making the method expensive in labor costs and difficult to industrialize. In addition, the treatment must be applied at least twice, once per face, giving rise to non-uniformity in the final material. Finally, the portion adjacent to the first-treated face is subjected to a greater duration of reaction with silicon, and therefore contains more silicon carbide.

Finally, proposals have also been made in document GB-A-2 137 974 to silicide a green body by placing it between two sources of silicon situated above and below the body to be treated. Each source of silicon comprises a brick of carbon foam silicided by infiltration of molten silicon. The silicon source situated above is infiltrated with silicon, while the source situated below rests in a crucible containing molten silicon and acts as a drain. That method requires a crucible to be used and enables only one green body to be treated at a time.

OBJECTS OF THE INVENTION

An object of the present invention is to provide a method enabling a molten metallic composition to be incorporated on an industrial scale in porous substrates.

In particular, an object of the invention is to provide a method enabling a plurality of parts to be treated simultaneously in uniform manner while ensuring that the parts are easily separable individually after treatment, i.e. without being welded to one another or to the supports or to the drains.

Another object of the invention is to provide a method making it possible to use conventional heat treatment means and not requiring crucibles for containing the molten metallic composition.

GENERAL DEFINITION AND ADVANTAGES OF THE INVENTION

According to the invention, a method of incorporating a metal-based composition simultaneously in a plurality of porous substrates is characterized by the steps of:

forming at least one vertical multilayer stack of alternating porous substrates in contact with and in contact with layers constituting sources of metal-based composition, each layer comprising a majority phase formed by the metal-based composition and a minority phase suitable for forming a retention and drainage structure for the metal-based composition in the molten state rigid spacers being provided in the intervals between consecutive substrates where a source is located; and heating the stack to a temperature higher than the melting temperature of the metal-based composition so that, from each source, the metal-based composition in the molten state can migrate through the adjacent surface of the, or each, lower and upper substrate adjacent to the source, towards the inside of the substrate.

By means of this method, each substrate can be put into the same conditions, thereby ensuring uniform treatment throughout the batch.

In addition, the working volume of a heat treatment furnace can be used in optimum manner for simultaneously treating a plurality of substrates, and no loss of working volume is caused by the need to have an offset source of liquid metallic composition as is the case in certain known techniques.

In addition, no retention crucible is required and it is possible to provide only that quantity of metal-based composition that is necessary and sufficient for the substrates to be treated in the desired manner in a single operation. Thus, particularly in the case of a substrate that contains carbon, it is possible to obtain total conversion of the base metal into the corresponding refractory carbide.

In addition, no special hot extraction means is required for extracting the treated substrates. By an appropriate selection of the minority phase producing the retention and draining structure in the source of metal-based composition, it is possible to ensure that the parts are easily separable after treatment.

BRIEF DESCRIPTION OF THE DRAWINGS

Implementations of the invention are described below in detail by way of non-limiting indication. Reference is made to the accompanying drawings, in which:

FIG. 1 shows a batch of porous substrates and sources of metal-based composition for implementing an embodiment of the invention;

FIG. 2 is a plan view of the source of metal-based composition in the batch of FIG. 1;

FIGS. 3A and 3B are views showing variant embodiments of a batch of porous substrates and sources of metal-based composition;

FIGS. 4 and 5 are a fragmentary elevation view and a plan view showing a variant embodiment of a source of metal-based composition;

FIGS. 6 and 7 are views showing other variant embodiments of batches of porous substrates and sources of metal-based composition; and FIG. 8 shows an effect of treatment in accordance with the invention.

DETAILED DESCRIPTION OF PREFERRED EMBODIMENTS OF THE INVENTION

For simplification purposes, the description below relates to incorporating in porous substrates a composition based on elemental metallic silicon, i.e. an "Si-based" composition, which is a composition made exclusively or mostly of silicon, with the elements optionally added to the silicon being selected, for example, amongst: boron, aluminum, zirconium, hafnium, titanium, molybdenum, tungsten, tantalum, . . .

It will immediately be clear to the person skilled in the art that the methods described can be implemented with other metal-based compositions, in particular with compositions made exclusively or mostly of one or more metals which, like silicon, have a melting temperature that is compatible with the materials of the substrates to be treated, i.e. preferably a melting temperature that is lower than 2000° C., and which are suitable for reacting with carbon to form refractory carbides, i.e. carbides having a melting temperature higher than 2200° C. Apart from silicon, such metals comprise in particular titanium, zirconium, hafnium, and vanadium.

As mentioned above, the method of the invention can be applied to various porous substrates, and particularly, but not exclusively, substrates of thermostructural composite materials such as C—C composites or CMCs, and in particular C–SiC composites (carbon reinforcing fibers and silicon carbide matrix) and SiC—SiC composites (reinforcing fibers and matrix essentially made of silicon carbide), because of the good wettability of silicon carbide by molten silicon. Prior to incorporating the Si-based composition in the molten state, the residual pore space of the thermostructural composite material may optionally be partially filled with fillers that are incorporated by means of a liquid, e.g. in suspension, and possibly capable of reacting with molten silicon. By way of example, such fillers are carbon/graphite powders, or a metal, or refractory metal compositions, e.g. borides.

With a C—C composite material, optimizing preparation thereof makes it possible for the incorporation of the Si-based composition in the molten state to cause a portion of the carbon matrix to be transformed into silicon carbide without the fibers of the fiber reinforcing fabric being affected.

The method of the invention can be implemented on substrates of carbon matrix composite material obtained by a liquid method, by chemical vapor infiltration, or by a combination of those two densification techniques. For example, the method of the invention can be implemented on a carbon matrix composite material obtained in part, in an initial stage, by chemical vapor infiltration, and also in part, in a second stage, by using a liquid. The first densification stage makes it possible to form a continuous coating of non-cracked pyrolytic carbon of constant thickness to be formed on the fibers of the reinforcing fiber fabric, thereby protecting the fibers during infiltration of the Si-based composition. The second densification stage, e.g. by impregnation and carbonization using a resin, leads to a coke of the resin being formed in the form of grains that are received in the pores of the residual pore space that remains after chemical vapor infiltration. This increases the specific surface area of the carbon that can react with the Si-based composition and makes it easier to close the pore space by reaction between the grains of resin coke received inside the pores and the Si-based composition.

For a carbon-containing substrate, in particular a carbon matrix composite material, the front where carbon is transformed into silicon carbide advances as the Si-based composition penetrates into the substrate. By controlling the quantity of silicon that can be supplied by the source of Si-based composition, it is possible to achieve partial siliciding to a greater or lesser depth (by supplying a deficiency of Si) or it can be ensured that free silicon is present at a determined concentration in the substrate (by supplying excess Si).

With a CMC material, in particular having an SiC matrix, incorporating the Si-based composition in the molten state results merely in the accessible residual pore space of the material being filled, but without any particular reaction taking place with the matrix. For a C–SiC material in which the SiC matrix is inevitably cracked by the effect of differential thermal expansion, the Si-based composition is incorporated at a temperature such that the cracks are closed and the carbon fiber reinforcement is protected from contact with the liquid silicon (i.e. at a temperature greater than 1410° C., the melting temperature of silicon). The same applies to an SiC—SiC material in which the fiber reinforcement fibers are coated with a pyrolytic carbon interphase as described in document EP-A-0 172 082.

It will also be observed that with an SiC matrix, incorporation of the Si-based composition can be preceded by fillers being incorporated, as mentioned above, or by an internal coating of pyrolytic carbon being formed with which the silicon can react to form silicon carbide. The internal coating of pyrolytic carbon is made either by chemical vapor infiltration or by impregnating and carbonizing an organic resin that leaves a silicon-wettable carbon residue, e.g. a phenol, epoxy, or polycarbosilane resin.

Various post-treatments can be applied after the silicon-based composition has been incorporated, in particular to eliminate or transform the non-combined residual excess silicon in the substrate, or to form surface coatings.

The invention relies on the observation made by the Applicant that by placing a source of Si-based composition in the form of an intermediate layer in the solid state between two porous substrates, and by raising the temperature to above the melting point of the composition, the composition is capable of migrating in substantially equal manner into both substrates, providing the source comprises a phase suitable for forming a retention and draining structure. This has been verified when the substrates are placed one above the other, being separated by sources of Si-based composition, with the liquid composition then migrating in similar manner into one of the substrates under gravity (downwards) and into the other substrate by capillarity (upwards).

The source of the Si-based composition comprising a majority phase constituted by the Si-based composition and a minority phase suitable for forming a retention and draining structure can be implemented in various ways.

The majority Si-based phase is preferably in finely divided form, e.g. a powder. It is constituted exclusively or mainly by silicon powder, possibly with other components added, likewise in powder form. These other components may be constituted, for example, by boron, aluminum, zirconium, hafnium, titanium, molybdenum, tungsten, tantalum, . . .

It is possible to envisage adding the component(s) other than silicon, not by mixing the silicon powder prior to incorporation in the substrate, but by incorporating them in the substrate before the silicon. These other powder components can be incorporated by any known means, e.g. by impregnating the substrate with a suspension containing said powders, possibly under pressure and/or with vacuum suction.

These various components associated with silicon make it possible to incorporate in a porous substrate a composition that is suitable for forming an alloy based on refractory silicides having a melting point higher than that of silicon, thereby making it possible to increase the overall high temperature stability of the material treated in this way. The atomic percentage of silicon in the initial composition is preferably considerably greater than 50%. These various compositions can thus be selected to end up by generating a glass, after treatment or use under an oxidizing atmosphere, e.g. by including boron.

Various embodiments of the minority phase and various component materials can therefore be adopted, providing the minority phase is suitable for forming a retention and drainage structure for the Si-based composition, and preferably insofar as the contact area between said structures and the substrates is small so as to make it as easy as possible to separate the substrates after treatment.

The minority phase may be rigid, e.g. a honeycomb structure, or non-rigid, in which case it forms a three-dimensional array, i.e., a structure extending throughout the volume of the majority phase. By way of example, the non-rigid structure may be constituted by a high-porosity felt, short fibers disposed in random manner, or a cellular foam.

The material constituting the minority phase is selected from materials that are wettable by silicon in the molten state and that cannot be completely destroyed thereby, or from precursors suitable for being transformed into such materials under the effect of the heating necessary to reach the melting point of silicon (about 1410° C.). Typically such materials are carbon or precursors therefor, silicon carbide or silicon nitriden, or precursors therefor.

The source of the Si-based composition is made so that both the majority phase and the minority phase therein are each distributed as uniformly as possible. The volume occupied by the minority phase is preferably selected to be as small as possible without spoiling the retention and drainage functions. As an indication, the volume percentage of the minority phase in the source of Si-based composition is selected to be less than 20%, and preferably lies in the range 0.5% to 5%.

The association of a majority phase in powder form with a minority phase in the form of a honeycomb is achieved quite simply by filling the cells of the honeycomb structure with the powder of the Si-based composition.

Associating a majority phase in powder form with a minority phase in the form of a felt having very open pores can be done, for example, by impregnating the felt with a suspension of a powder of Si-based composition in a liquid vehicle such as water, and by drying. Impregnation can be performed by feeding the suspension to one side of the felt and filtering it on the opposite side so as to retain powder in the felt. Passage of the suspension through the felt can be forced by establishing a pressure difference between the opposite sides of the felt. The fibers constituting the felt may, for example, be carbon or silicon carbide or a precursor therefore such as an organic compound (pitch, viscose, cellulose, . . . ) or an organo-metallic compound (carbosilazane, . . . ).

A majority phase in the form of a powder is associated with a minority phase in the form of short fibers or in the form of a powder by intimately mixing the minority phase in a suspension of the Si-based composition, forming, and drying. Forming can be by molding, making it possible to give the source of Si-based composition desired shape and size in the form of a solid body for incorporating between two substrates to be treated, with molding being followed by drying in an oven. The fibers or the powder are of carbon or silicon carbide or of an organic or an organo-metallic precursor therefor.

A majority phase in the form of a powder can be associated with a minority phase in the form of a foam by impregnating a foam and then drying, in the same manner as that indicated above for a felt. By way of example, the foam can be carbon or of an expanded carbon-precursor material such as a phenol resin. In a variant, it is possible to start from an intimate mixture of a suspension of the Si-based composition and a cokefiable resin, e.g. an epoxy resin, a phenol resin, . . . The mixture can be molded and heated so as to cross-link the resin and obtain a source of Si-based composition that is constituted by a solid body having predetermined shape and size.

An example of a batch comprising porous substrates to be treated associated with sources of Si-based composition is shown in FIG. 1. Similar porous substrates 10 in the form of rectangular parallelepipeds are stacked vertically with their large faces horizontal, in alternation with sources 12 of an Si-based composition in the solid state which forms intermediate layers.

In the example shown, each of the layers 12 is formed by a honeycomb structure 12a of constant thickness, constituting the minority phase, having its cells filled with the Si-based composition 12b, which is in powder form (FIG. 2).

By way of example, the honeycomb structure is made of a C-phenol composite, i.e. comprising a reinforcing structure of carbon fibers and a matrix of phenol resin. To make the honeycomb structure, it is possible to use a method analogous to that described in document EP-A-0 573 353.

The walls of the cells in the honeycomb structure 12a are perpendicular to the facing faces of the substrates 10 between which each structure 12 is placed. The rigidity of the structure in this direction enables it to act as a spacer between substrates, while nevertheless having minimal contact area therewith.

The stack made in this way is placed in a heat treatment furnace 14. It stands on a support 16 via a layer $12_1$ acting as a source of Si-based composition adjacent to the bottom face of the substrate $10_1$ situated at the bottom of the stack. A layer $12_2$ is placed on top of the stack to act as a source of Si-based composition adjacent to the top surface of the substrate $10_2$ situated at the top of the stack. The layers $12_1$ and $12_2$ are made in the same manner as the intermediate layers 12, however they may contain less Si-based composition, for example by being of smaller thickness, given that they need to supply Si-based composition to one face only of a substrate. Although a single stack of substrates 10 and sources 12 is shown in FIG. 1, it will readily be understood that a plurality of similar stacks can be loaded side by side into the furnace, providing the dimensions thereof make this possible.

The substrates are treated at a temperature that is selected to be higher than the melting temperature of silicon, but lower than its vaporization temperature, i.e. lying in the range 1410° C. to 2000° C. The treatment temperature preferably lies in the range 1410° C. to 1600° C. Treatment is performed at low pressure, e.g. at less than 0.5 bars, in an inert atmosphere, e.g. in an argon atmosphere, or else in a vacuum.

When the Si-based composition contained in the layers 12 reaches its melting point, it migrates towards the adjacent substrates through their surfaces in contact with the layers 12. From each layer 12, this migration takes place by gravity towards the substrate situated beneath it and by capillarity towards the substrate situated above it. Surprisingly, as appears from the examples given below, the upward migration is practically identical to the downward migration. The honeycomb structures 12a serve both to retain the silicon-based liquid composition and to drain it so as to enable migration to take place by capillarity. At the end of the treatment, the weakened structures 12a with very limited contact area with the substrates make it easy to separate the individual treated substrates, particularly since it is possible to ensure that the residual quantity of Si-based composition in the layers 12 is minimal. One of the advantages of the method is the ease with which it is possible to control the quantity of Si-based composition that is to be incorporated in the substrates, depending on the degree of treatment that is to be performed. This control is performed by appropriately selecting the volume of the cells in the structure 12a, i.e. the thickness thereof.

In order to make it even easier to separate the treated substrates, it is possible to envisage prior application of an unmolding agent on those surfaces of the structures 12a that are to come into contact with the substrates. Such an unmolding agent may be graphite or boron nitride, for example, applied by spraying a suspension of powder on the end edges of the cells, followed by drying.

FIGS. 3A and 3B show variant implementations of the method of the invention.

In these variants, similar porous substrates 20 in the form of rectangular parallelepipeds are stacked vertically, alternating with sources 22 of Si-based composition in which the minority phase suitable for forming a retention and drainage structure is constituted by short fibers 22a distributed in random and uniform manner throughout the Si-based composition 22b. Sources 22 are placed between the substrates, and also at the bottom and top ends of the stack.

The sources 22 are solid bodies of uniform thickness obtained by intimately mixing short fibers 22a in a suspension of the Si-based composition in the form of a powder optionally together with a small quantity of organic binder, by molding the mixture, and by drying it in an oven. The fibers 22a are, for example, carbon fibers or silicon carbide fibers of a length that is preferably less than 10 mm. The percentage by volume of the fibers 22a in the body 22 can be small without spoiling their ability to constitute a structure for retaining and draining the Si-based composition in the molten state. As an indication, the volume percentage thereof can be less than 20%, e.g. lying in the range 0.5% to 5%. The organic binder that is optionally added preferably represents less than 5% by weight of the mixture.

Once the Si-based composition is in the molten state, the structure constituted by the fibers 22a is not sufficiently self-supporting to withstand the compression forces exerted in the stack during treatment. The stack therefore further includes rigid spacers disposed between the substrates, e.g. studs 28 placed in holes in the bodies 22. The height of the studs 28 is no greater than the thickness of the molded bodies 22 (FIG. 3A) and may even be slightly smaller (FIG. 3B) so as to guarantee that contact is maintained between the substrates and the sources of Si-based composition when the composition is in the molten state. In order to ensure drainage towards the upper substrate, it is necessary for contact between the fibers 22a and the bottom surface of the substrate to be maintained throughout the treatment. In addition, in the embodiment of FIG. 3B, the compression force is exerted solely through the molded bodies, thereby making it possible to keep them at constant thickness; furthermore, there is indirect contact between the top substrate and the spacers via the source of Si-based composition which is necessarily in contact with the top substrate. The studs 28 are preferably of a material that is fairly inert relative to molten silicon, e.g. silicon nitride, silicon carbide, or carbon coated in boron nitride.

At the end of treatment, the substrates are easily separated from one another. Since the fibers 22a have been subjected to siliciding, they are brittle and can be removed by brushing. The quantity of Si-based composition incorporated in the substrates depends on the volume of the sources 22 and can therefore easily be controlled by selecting the thickness of the molded bodies 22.

It may be observed that in a variant, the studs 28 may be replaced by a rigid frame surrounding the body 22. In addition, the use of spacers can also be envisaged, as a safety measure, even when the retention and drainage structure is self-supporting, as when using the honeycomb structure of FIGS. 1 and 2.

Also by way of a variant, each source of Si-based composition adjacent to a substrate may be implemented in modular form, being built up from a plurality of unit sources or elements.

FIGS. 4 and 5 thus show a source 32 of Si-based composition made up of a plurality of elements 32' distributed in the gap between two substrates 30. By way of example, the elements 32' are cylindrical elements in the form of same-dimension wheels. This solution makes it possible to build up sources having different areas while using standard elements. It should be observed that the source elements 32' are not necessarily placed side by side. A plurality of studs 38 can be inserted amongst the source elements 32', with the studs 38 performing a function similar to that of the studs 28 in FIG. 3.

In the above, it is assumed that stacks are formed made up of similar substrates in the form of rectangular parallelepipeds. Clearly the method can be implemented using substrates that are of other shapes, e.g. cylinders, annuluses, . . . , with the shapes of the sources of Si-based compositions that are interposed between the substrates being adapted accordingly.

Nor is there any need for all of the substrates to be identical. Thus, substrates having the same outside shape but different thicknesses can be treated simultaneously. The quantity of Si-based composition to be incorporated in the substrates can then vary as a function of the thicknesses thereof. The quantity of Si-based composition in each of the sources 22, i.e. the thickness of each of them, must then match accordingly, as a function of which substrates are adjacent.

Nor is it necessary for all of the substrates that are to be treated to have the same outside shape. Thus, FIG. 6 shows a batch comprising, going up from the bottom, a first series of same-diameter disks 40, a second series of smaller-diameter disks 40', and a third series of even smaller-diameter disks 40". The sources 42, 42', 42" of Si-based composition interposed between the disks are of dimensions that are a function of the dimensions of the adjacent substrates, such that the diameter of a source is always at least as great as the diameter of both adjacent substrates, or greater than said diameters.

It will also be observed that the method of the invention can be implemented using substrates having faces that are not plane, e.g. by using sources of Si-based composition having faces that are of complementary shape. This is shown in FIG. 7 in which there can be seen a stack comprising annular substrates 50 of greater thickness in their central portions than in their peripheral portions. These substrates may, for example be C—C composite brake disks.

The sources of Si-based composition interposed between the substrates and placed at the ends of the stack are advantageously constituted by solid annular bodies molded from an intimate mixture of short carbon fibers in a suspension of the Si-based composition in the form of powder having a small amount of acrylic binder added thereto. The molded bodies 52 have faces which present relief that is complementary to that of the faces of the substrates with which they come into contact. Thus, each molded body interposed between two substrates is of smaller thickness in its central portion than in its peripheral portion. Spacers 58 in the form of studs are interposed between the substrates in order to prevent the bodies 52 being crushed when the Si-based composition is in the molten state.

In the example shown, the molded bodies 52 are made as single pieces, however that is not essential, it being possible for each source of Si-based composition to be made up from a plurality of unit sources or elements.

Various tests have been performed to verify the ability of a source of Si-based composition to distribute said composition in substantially equal manner in both of the substrates situated on either side of the source, adjacent thereto, even when one of the substrates is situated above the source while the other is beneath it.

EXAMPLE 1

Two samples of C—C composite material in the form of rectangular parallelepipeds of thickness equal to 25 mm and having residual open pore space representing about 13% by volume, were placed one above the other. A source of silicon was placed between those two samples, which source was constituted by a honeycomb structure of C-phenol composite material having its cells filled with silicon powder. The honeycomb structure had a thickness of 10 mm and it represented 3% by volume of the source of silicon.

The assembly built up in that way was placed in a furnace and raised to a temperature of 1500° C. at a pressure of 10 mbar of argon for 1 hour. After cooling, it was observed that the molten silicon had migrated both into the lower sample by gravity and into the upper sample by capillarity. 93% of the mass of silicon initially contained in the silicon source had migrated into the samples, and of the quantity that migrated, 46% was to be found in the upper sample and 54% in the lower sample. The treated samples were easily separated because of the small contact area with the honeycombs, with the honeycomb being practically reusable.

This test showed, surprisingly, that it is possible to treat simultaneously and in practically symmetrical manner, two parts situated one above and the other below a source of silicon, with almost as much migration taking place in one direction as in the other.

EXAMPLE 2

The procedure was the same as in Example 1 except that three samples of C—C composite material in the form of rectangular parallelepipeds were stacked with two interposed sources of silicon. The samples were blocks having a thickness of 22 mm with residual open pore space constituting 13% by volume, and the silicon sources were constituted by honeycomb structures having a thickness of 10 mm and filled with silicon powder.

After cooling, the stack was extracted from the furnace and it was observed that the samples were easily separated from the honeycomb structures which were then empty of silicon. The final amount of residual pore space in the bottom, middle and top samples were respectively equal to 8%, 3%, and 9% by volume. In conformity with the observation made in Example 1, it was the middle sample which received most silicon, given that it was in contact with a source of silicon via each face.

EXAMPLE 3

The procedure of Example 2 was followed, except that the sources of silicon used were constituted by honeycomb structures having a thickness of 15 mm and filled with silicon powder.

The final amount of residual pore space as measured were equal to 7%, 3%, and 6% for the bottom, middle, and top samples respectively. This example, in comparison with Example 2, shows that it is possible to vary the quantity of silicon incorporated in the samples by varying the thickness of the honeycomb structure, i.e. by varying the capacity of the sources of silicon.

EXAMPLE 4

Three solid disks of C—C composite materials were placed one above the other with sources of silicon interposed between pairs of adjacent disks, the sources being constituted by honeycomb structures having their cells filled with silicon. The disks had a diameter of 100 mm and a thickness of 22 mm, and the honeycomb structures were 15 mm thick. The stack was placed in a furnace, being placed on a source of silicon identical to those interposed in the stack, and another source of silicon of the same kind was placed on top of the stack. As a result, each disk to be treated was situated between two sources of silicon.

The temperature in the furnace was raised to 1500° C. for 1 hour under argon at a pressure of 10 mbar. After processing and cooling, the disks were easily separated, as were the honeycomb structures. The residual amounts of pore space in the disks were measured and found to be 3%, 2%, and 4% respectively going up from the bottom of the stack, as compared with initial residual pore space of 13%.

Compared with Examples 2 and 3, it can be seen that the disks placed at the ends of the stack were treated in a manner that was substantially identical to the intermediate disk, because of the sources of silicon present at the ends of the stack.

This example shows that the method of the invention makes it possible to treat a plurality of stacked porous substrates in substantially uniform manner.

EXAMPLE 5

A stack was made as described in Example 2, however the sources of silicon having a honeycomb as the minority phase were replaced by bodies molded from an intimate mixture of carbon fibers in suspension in silicon powder. The mean length of the carbon fibers was 3 mm, e.g. being fibers of the "T300" type from the Japanese company "Toray". The percentage by volume of the carbon fibers relative to the silicon was about 1%.

After performing heat treatment as in Example 2 and then allowing cooling to take place, it was observed that all that remained between the samples was a friable mass resulting from the carbon fibers being silicided, thus making the samples easy to separate. Moderate brushing of their surfaces made it possible to return them substantially to their original shape.

The measured values for the residual pore space in the three samples were respectively 3%, 2%, and 5% for the bottom, middle, and top samples, respectively.

Comparing Examples 2 and 5 show that the three-dimensional structure constituted by short fibers dispersed in silicon performs the functions of the retention and drainage structure in the same manner as does the honeycomb structure.

It was also observed that the residue of the molded body at the bottom of the stack was compressed to a greater extent than was the residue of the body at the top, given the greater compression forces exerted at the bottom of the stack. That is why, in a stack having a larger number of porous parts to be treated, it is required to provide spacers between the parts, as described with reference to FIG. 3.

EXAMPLE 6

A stack was made as in Example 2, except that the samples were made of C–SiC composite material, and the carbon fibers therein were high strength fibers while the SiC matrix was obtained by chemical vapor infiltration.

The stack was treated as in Example 2. After treatment, the samples were easy to separate. The final amounts of residual pore space in the samples was equal respectively to 10%, 7%, and 12% by volume for the bottom, middle, and top samples, whereas initially it had been 20% by volume in the C–SiC composite material.

A bending to rupture test was performed on a test piece coming from the middle sample and having the following dimensions 60 mm×10 mm×5 mm. Rupture was recorded at a force of 100 daN, whereas a test piece having the same dimensions and taken from the initial material ruptured at 110 daN. This demonstrates that the carbon fibers of the C–SiC composite material were not degraded by the treatment.

EXAMPLE 7

A stack was made as in Example 2, however the samples used were made of SiC—SiC composite material with fiber reinforcement made of silicon carbide based fibers, as sold under the name "NICALON"® by the Japanese company "Nippon Carbon", and the SiC matrix was obtained by chemical vapor infiltration. The initial residual pore space in the samples was 5% and they were 4 mm thick, while the sources of silicon comprised honeycomb structures having a thickness of 6 mm.

After treatment and after the parts had been separated, the pore space in the middle sample was no longer measurable (much less than 1%).

A traction test was performed to rupture on a test piece taken from the middle sample. The treated material was found to have a breaking stress of 185 MPa as compared with 250 MPa for the initial SiC—SiC material. Breakage mode remained non-brittle. In spite of the high temperature at which treatment took place, the strength of the material was degraded to a small extent only.

Examples 6 and 7 show that the method can be implemented not only using carbon substrates, but also with substrates made of silicon-wettable material, other than carbon, and in particular SiC.

In addition, Example 7 shows that the method of the invention can be used for the purpose of sealing a porous material, by adjusting the quantity of available Si-based composition.

EXAMPLE 8

A test comparable to that of Example 6 was performed using samples of C–SiC material having an initial residual pore space equal to 20%.

However, before stacking and treatment, the samples were impregnated with a phenol resin which was polymerized and carbonized, thus reducing the pore space of the material to 14%.

After treatment, it was observed that the residual pore space of the middle sample was 4%.

This example shows that the method can be used to treat composite materials of non-uniform matrix, specifically having an SiC/C matrix, providing one of the components of the matrix is wettable by molten silicon.

EXAMPLE 9

A test was performed similar to Example 4 except that instead of silicon, an Si-based composition was used made up of silicon and of boron, boron representing an atomic 8% in the composition. Such an alloy is known. Its melting point is 1385° C.

After treatment, the residual pore space in each of the disks was equal respectively to 3%, 2%, and 3%, starting from the bottom of the stack.

This example shows that the method can be implemented with compositions other than pure silicon, providing silicon is a majority component therein. The use of an Si+B system makes it possible to improve the resistance to oxidation of the C—C material treated in this way since it gives rise to a borosilicate glass being formed that has healing properties, instead of a brittle layer of silicon. The term "healing" properties is used herein to mean that cracks can be filled in by the material passing into a semisolid state at the operating temperature.

EXAMPLE 10

A test was performed similar to that of Example 4, however each C—C composite material disk was replaced by two touching disks each having a thickness of 10 mm, and by using for the sources of silicon minority phases in the form of honeycomb structures having a thickness of 4 mm. In order to facilitate subsequent separation, the two disks in each pair of adjacent disks were separated by a thin sheet of recompressed expanded graphite such as that sold under the name "SIGRAFLEX"® by the German company SIGRI GmbH.

After treatment, the samples were separated, sectioned transversely, and oxidized in air at 800° C. in order to reveal the silicided zones that withstand oxidation. In a pair of disks that were initially adjacent in the stack, the silicided zones appeared as shown in the shaded portions of FIG. 8.

It can be seen that the two disks were silicided in part, with the disk that was initially on top being silicided from its top face while the disk that was underneath was silicided via its bottom face.

This example shows that the method can be used to perform local and controlled treatment of a plurality of parts in a single cycle.

It should also be observed that localized access to certain portions of the surfaces of the substrate can be achieved, e.g. by masking the other portions of the surface by means of a barrier that is proof against molten silicon, and that is interposed between the substrate and the source of Si-based composition. This makes it possible to leave portions of the surface untreated, e.g. to avoid the need to machine them again after treatment. The barrier can be constituted by sheets of recompressed expanded graphite or by a layer of boron nitride. It is also possible to envisage using sources of Si-based composition that are highly localized, i.e. that do not cover the entire surface of the substrates that are to be treated in uniform manner, with this being possible in continuous or in discrete manner.

EXAMPLE 11

The stack shown in FIG. 4 was made using annular brake disks of C—C composite having an outside diameter of 400 mm, an inside diameter of 250 mm, a thickness of 40 mm in the central portion, and a thickness of 30 mm in the peripheral portion. The sources of silicon were bodies molded from a mixture of silicon powder having 95% by volume silicon powder, 1% by volume short carbon fibers, and 4% by volume acrylic binder.

The residual open pore space of the disks was initially 13% by volume and the sources of silicon were dimensioned to contain approximately 2.2 times the quantity of silicon necessary for completely filling in said pore space.

The heat treatment was performed at 1550° C. for 1 hour under 80 mbar of argon.

After treatment, it was observed that the disks could easily be separated and that they could be returned to their initial shape by moderate brushing of their faces.

After the disks had been sectioned and oxidized under air at 800° C. in order to reveal the silicided zones, it was observed that the C—C material had been silicided in uniform manner throughout its entire volume.

EXAMPLE 12

The stack of FIG. 4 was made using annular brake disks of C—C composite material obtained by densifying a fiber reinforcing structure successively by chemical vapor infiltration giving a first matrix phase of pyrolytic carbon, and by liquid means using a phenol resin, giving a second matrix phase of resin coke. The disks had an outside diameter of 400 mm and an inside diameter of 250 mm, a thickness of 40 mm in the central portion, and a thickness of 30 mm in the peripheral portion, and they had residual pore space of 23% by volume.

The sources of silicon were bodies molded from a mixture of silicon powder representing 95% by volume, 1% by volume short carbon fibers, and 4% by volume acrylic binder. The sources were dimensioned so as to contain approximately 1.5 times the quantity required for completely filling the initial residual pore space in the substrates.

Heat treatment was performed at 1550° C. for 1 hour under 80 mbar of argon.

After treatment, it was observed that the disks could be separated easily and that moderate brushing of their faces made it possible to return them to their initial shape.

The disks were sectioned and oxidized under air at 800° C. in order to reveal the silicided zones, and it was observed that the C—C material had been silicided in uniform manner throughout its entire volume.

EXAMPLE 13

The stack shown in FIG. 4 was made using C—C composite material samples with a carbon matrix obtained by chemical vapor infiltration. The samples had a thickness of 30 mm and their initial residual pore space was 10% by volume.

The sources of silicon were bodies molded from a mixture of silicon powder comprising 95% by volume, 1% by volume of short carbon fibers, and 4% by volume of acrylic binder. The sources were dimensioned so as to contain approximately 1.5 times the quantity required for completely filling the initial residual pore space of the substrate.

Heat treatment was performed at 1550° C. for 1 hour under 80 mbar of argon.

In order to eliminate the presence of any free silicon in the silicided samples, post-treatment was performed to transform such free silicon into silicon carbide. This transformation of the free silicon was performed at 1300° C. under 80 mbar of argon enriched with 2% by volume of methane.

After the post-treatment, the final residual pore space in the parts was less than 4%.

The parts were sectioned and oxidized at 800° C. in air for 24 hours to eliminate the carbon, heat treatment was performed at 1800° C. under secondary vacuum, conditions under which it is known that silicon evaporates. Since the mass of the parts did not vary, it can be deduced that there remained no free silicon after the post-treatment.

This example shows that it is possible to obtain parts of silicided C—C composite containing a substantial quantity of SiC coming from the transformation of free silicon, without excessively damaging the matrix of pyrolytic carbon and the carbon fibers of the fiber reinforcing structure, with the residual pore space being small and not containing any free silicon.

Such parts are advantageously applicable in the nuclear field for making protective coatings for the walls of a plasma confinement chamber in a nuclear fusion reactor.

The presence of a substantial quantity of silicon carbide improves resistance to erosion, and thus lifetime, without that resulting in a massive transformation of the pyrolytic carbon matrix and the carbon fibers, since that would spoil the thermal conductivity of the parts. In addition, the absence of free silicon prevents the plasma being polluted when operating at a temperature higher than the melting temperature of silicon. Finally, the low residual pore space reduces ability to retain radioactive tritium.

What is claimed is:

1. A method of incorporating a metal-based composition simultaneously in a plurality of porous substrates, comprising the steps of:

provicing a plurality of sources of metal-based composition, each source comprising a majority phase formed by the metal-based composition and a minority phase suitable for forming a retention and drainage structure for the metal-based composition when in the molten state, and each source being in the form of a layer having opposite first and second surfaces, forming at least one vertical multilayer stack of alternating porous substrates and sources of metal-based composition, the or each source located between two consecutive substrates having its first surface in contact with an upper surface of one of said two consecutive substrates and its second surface in contact with a lower surface of the other one of said two consecutive substrates, with rigid spacers being provided over the whole height of each interval between two consecutive substrates where a source is located, and heating the stack at a temperature higher than the melting temperature of the metal-based composition to cause the metal-based composition in the molten state from each source to migrate through the adjacent surface of the or each substrate adjacent to said source, towards the inside of the substrate, the metal-based composition of each source located between two consecutive porous substrates migrating towards the inside of said two consecutive substrates respectively downwardly and upwardly, said spacers preventing the sources to be crushed during the process of incorporation of the metal-based composition into the porous substrates.

2. A method according to claim 1, including the provision of sources of metal-based composition having a minority phase in the form of a rigid cellular structure comprising rigid walls extending between its opposed first and second surfaces.

3. A method according to claim 2, wherein said minority phase is a honeycomb structure.

4. A method according to claim 2, wherein said metal-based composition is in the form of powder filling the cells of said rigid structure.

5. A method according to claim 1, including the provision of sources of metal-based composition having a minority phase in the form of a three-dimensional non-rigid structure, and the insertion of rigid spacers in the intervals between consecutive substrates.

6. A method according to claim 5, wherein said minority phase is made up of divided elements forming a three-dimensional structure and distributed through the metal-based composition.

7. A method according to claim 6, wherein said divided elements represent less than 20% by volume in the source of metal-based composition.

8. A method according to claim 6, wherein said three-dimensional structure is formed of fibers.

9. A method according to claim 8, wherein said three-dimensional structure is formed of short fibers.

10. A method according to claim 6, wherein said sources of metal-based composition are made by mixing elements in divided form in a suspension containing said metal-based composition in powder form.

11. A method according to claim 10, wherein said mixture further comprises an organic binder.

12. A method according to claim 11, wherein said organic binder represents less than 5% by weight of the mixture.

13. A method according to claim 11, wherein each layer constituting a source of metal-based composition is constituted by a plurality of elementary sources.

14. A method according to claim 11, wherein said sources of metal-based composition are made in the form of molded bodies.

15. A method according to claim 14, wherein said first and second surfaces of the molded bodies that are to come into contact with the substrates are given shapes that are complementary to the shapes of the adjacent surfaces of the substrates in the stack.

16. A method according to claim 11, wherein the minority phase is of a material selected from carbon, silicon carbide, silicon nitride, and precursors of carbon, silicon carbide, and of silicon nitride suitable for being transformed into carbon, silicon carbide, or silicon nitride during the heating step.

17. A method according to claim 11, wherein the metal-based composition comprises one or more metals selected from silicon, titanium, zirconium, hafnium, and vanadium.

18. A method according to claim 17, wherein the metal-based composition is a silicon-based composition comprising more than 50% silicon atoms, the remainder being constituted by at least one of the elements comprising: boron, aluminum, zirconium, hafnium, titanium, molybdenum, tungsten, and tantalum.

19. A method according to claim 18, wherein said substrates contain carbon and are at least partially silicided through chemical reaction between said carbon and silicon contained in the metallic-based composition which migrates into said substrates.

20. A method according to claim 19, wherein the porous substrates are of carbon-carbon composite material.

21. A method according to claim 20, wherein the porous substrates are of carbon-carbon composite material having a carbon matrix comprising a first matrix phase constituted by pyrolytic carbon obtained by chemical vapor infiltration and a second matrix phase constituted by resin coke.

22. A method according to claim 19, wherein the degree of siliciding of said substrates is adjusted by selecting the thickness of said sources of metal-based composition.

23. A method according to claim 19, wherein, prior to incorporating said metal-based composition, fillers are incorporated in said substrates.

24. A method according to claim 19, wherein portions of said substrates are silicided selectively.

* * * * *

UNITED STATES PATENT AND TRADEMARK OFFICE
CERTIFICATE OF CORRECTION

PATENT NO.    : 6,110,535
DATED         : August 29, 2000
INVENTOR(S)   : Jacques Rey et al.

It is certified that error appears in the above-identified patent and that said Letters Patent is hereby corrected as shown below:

Column 4,
Lines 18 and 19, "substrates in contact with and in contact with layers", should read -- substrates and layers --;

Column 18,
Lines 3, 6, 14 and 19, "claim 11" should read -- claim 1 --.

Signed and Sealed this

Twenty-eighth Day of June, 2005

JON W. DUDAS
*Director of the United States Patent and Trademark Office*